United States Patent [19]
Zill

[11] 3,750,098
[45] July 31, 1973

[54] DOWNHOLE ACOUSTIC LOGGING CONTROL SYSTEM

[75] Inventor: Fred W. Zill, Houston, Tex.

[73] Assignee: Schlumberger Technology Corporation, Houston, Tex.

[22] Filed: Nov. 13, 1970

[21] Appl. No.: 89,507

Related U.S. Application Data

[63] Continuation of Ser. No. 710,279, March 4, 1968, abandoned.

[52] U.S. Cl............................ 340/18 CM, 181/.5 OS
[51] Int. Cl........................... G01v 1/22, G01v 5/00
[58] Field of Search.............................. 340/18 CM; 250/83.6 W; 324/34; 73/152; 181/.5 OS

[56] References Cited
UNITED STATES PATENTS

| | | | |
|---|---|---|---|
| 3,311,876 | 3/1967 | Lee | 340/18 CM |
| 3,187,301 | 6/1965 | Summers | 250/83.6 W |
| 3,186,223 | 6/1965 | Wilson | 73/152 |
| 2,554,844 | 5/1951 | Swift | 73/152 |

Primary Examiner—Benjamin A. Borchelt
Assistant Examiner—N. Moskowitz
Attorney—Brumbaugh, Graves, Donahue & Raymond

[57] ABSTRACT

Apparatus for acoustically logging a borehole to obtain indications of the effectiveness of the cement between a casing and a borehole to prevent fluid communication characterized by a downhole digital control system for repetitively energizing an acoustic transmitter and selectively coupling electrical signals developed by the receivers upon receiving transmitted acoustic energy to a signal channel. The signal channel is arranged to provide at least two degrees of amplification of the electrical signals in a sequence synchronized with the transmissions of acoustic energy from the transmitter. In a predetermined order, electrical signals from each receiver corresponding to different acoustic transmissions will be amplified to respective different degrees and coupled to a conductor for transmission to the surface. For the purpose of identifying the receiver and degree of amplification selected, the system provides, at preselected intervals, both an identifying pulse signal and a calibration signal of reference amplitude and frequency. All functions of the downhole system are controlled by a digital sequence counter and associated circuits which automatically select the receiver, the degree of amplification and relative time of occurrence of each signal during each sequence.

45 Claims, 6 Drawing Figures

DOWNHOLE ACOUSTIC LOGGING CONTROL SYSTEM

This application is a continuation of Ser. No. 710,279, filed Mar. 4, 1968, now abandoned.

BACKGROUND OF INVENTION

This invention relates to borehole acoustic logging techniques, and more specifically to an improved control system for providing electrical signals representing both the quality and degree of cement bonding between a casing and the borehole formations to effect a fluid shut-off, as well as other signals necessary or desirable for the extraction of the information sought. To this end, the system provides a versatility allowing its use in logging operations in which cement bond, radiation, casing collar and formation characteristic information in the form of electrical signals may be derived and transmitted to the surface in a known sequence for processing and recording.

After a borehole is drilled in earth formations, it may be logged acustically in order to determine the properties of the earth formations which, in turn, may be related to the presence and location of hydrocarbons. It is now nearly universal practice to line the borehole with a metal casing, generally made up of a series of pipe lengths coupled together. Subsequently, the annulus between the casing and the formations is filled by pumping a cement in slurry form into the annulus.

It is important, for several reasons, to have the cement fill the annulus between the casing and borehole formations in order that the hydrocarbon-bearing strata enter directly into the casing when it is subsequently perforated and, further, in order that migration of fluids in the annulus between adjacent formations is prevented. Before the casing is perforated, therefore, it is important to have accurate information of not only the characteristics of the formations but the nature of the cement annulus surrounding the casing.

In order to obtain such information, the cased borehole may be logged acoustically to obtain different electrical indications of each of those properties and characteristics. The characteristics of the formations themselves, for example, may be analyzed from a record of the travel time of acoustic energy between an acoustic transmitter and receiver, or between two or more receivers. In order to obtain what is commonly called a cement bond log (CBL), indicating the presence or absence of a cement bond to the casing, the attenuation of the acoustic energy arriving through the casing is recorded. Also, a record of the characteristics of the formations may be obtained from the attenuation of the acoustic energy traveling through the formations (but not the casing) between spaced acoustic transducers.

At the surface, the electrical signals representing all of the foregoing properties must not only be identifiable, but must be as free as possible from signal distortion caused by intolerable saturation of amplifiers used for strengthening the received signals in the downhole equipment. To insure that amplifier saturation does not take place, a low gain must be used where strong acoustic signals are anticipated. On the other hand, where the anticipated electrical signals from the receivers are weak, strong amplification must be provided. Coupled with those considerations is the type of recording taking place at the surface. In order to obtain accurate indications of travel time ($\Delta t$) for example, the electrical signals developed by the acoustic receivers must be highly amplified by reliable processing by the surface equipment. It has been found that electrical signals indicative of the degree of the cement quality, on the other hand, must, for reliability, be amplified to a lower degree by the downhole equipment, since the acoustic energy involved is generally of much greater amplitude than the early acoustic energy arriving through a well-bonded casing.

The retrieval of electrical signals from the downhole system is further complicated by the fact that the degree of satisfactory downhole amplification may be subject to the precise information to be extracted from a single electrical signal. When logging for the presence of a cement bond, for example, the relative attenuation of the initial portion of the acoustic energy between the downhole transmitter and receiver is taken as the primary indicator. Since that portion of the acoustic energy is at a relatively low amplitude, the electrical signal developed by the receiver is amplified to a high degree. It is now realized, however, that the quality, as distinguished from the presence, of the cement bond (CQL) can be determined by processing the receiver signal corresponding to the later-arriving portion of the transmitted acoustic signal, which still contains substantial levels of signal. That portion of the electrical signal, therefore, must be amplified to a relatively lower degree. Also to be taken into account is the capability of the system for providing further signals representing other desired information, such as radiation and casing collar location (CCL). In a monocable logging system, these additional signals must not interfere with the CBL and CQL signals.

SUMMARY OF THE INVENTION

It is therefore among the objects of this invention to provide a downhole acoustic logging control system which meets the requirements of the various types of logging which must be carried out under different conditions of downhole amplifier gain and for as many types of electrical signals as possible which must be transmitted and analyzed at the surface.

A further object of this invention is to provide an improved downhole control system for obtaining quality electrical signals for determining the properties of the effectiveness of the cement sheath between the casing and formations.

Another object of the invention is to provide an acoustic logging system for providing one or more identification, timing and calibration signals in addition to electrical logging signals to the surface equipment.

Yet another object of this invention is to provide an improved acoustic logging control system employing digital techniques and apparatus.

Briefly, the foregoing objects are attained in a system which repetitively energizes the acoustic transmitter to develop one or more electrical signals for provision to an amplifying means of which the gain may be controlled. To this end, means synchronized with the transmission of acoustic energy controls the gain of the amplifying means such that at least two electrical signals amplified to different degrees are derived during any measurement sequence comprised of successive measurement time intervals. In general, each measurement time interval will include one transmission of acoustic energy, together with the corresponding electrical signal from the receiver. In a preferred embodiment of the invention, the control system automatically generates a distinct identification signal, a calibration or reference signal and a timing signal during each measurement time interval, whereby each amplified electrical signal transmitted to the surface is accompanied by an identification and calibration signal.

Preferably, the control system is comprised of a digital sequence counter or shift register which receives pulses from a reference pulse generator, with a predetermined count of the sequence counter representing the end of each time measurement interval. Gating means responsive to selected counts of the sequence counter are energized to gate the calibration and amplified electrical signals to the cable for transmission to the surface. During any count of the sequence counter up to the predetermined count, the gain of the amplifying means, as well as the receiver selected and the form of the identifying signal, is fixed. Upon attainment by the sequence counter of the predetermined count, the counter is reset to its initial state, representing the completion of the operational mode, and the amplifying means is conditioned to amplify the next or a subsequent electrical signal at a different gain. At the same time, a different receiver may be selected and the identification signal is changed in format from the previous identification signal. When all desired operational modes, e.g. combinations of amplifier gain and receivers, are completed, the sequence is again initiated automatically.

DESCRIPTION OF THE DRAWINGS

For a better understanding of the invention, together with the further objects and advantages thereof, reference may be made to the following detailed description, and to the drawings, in which.

Figure 1:
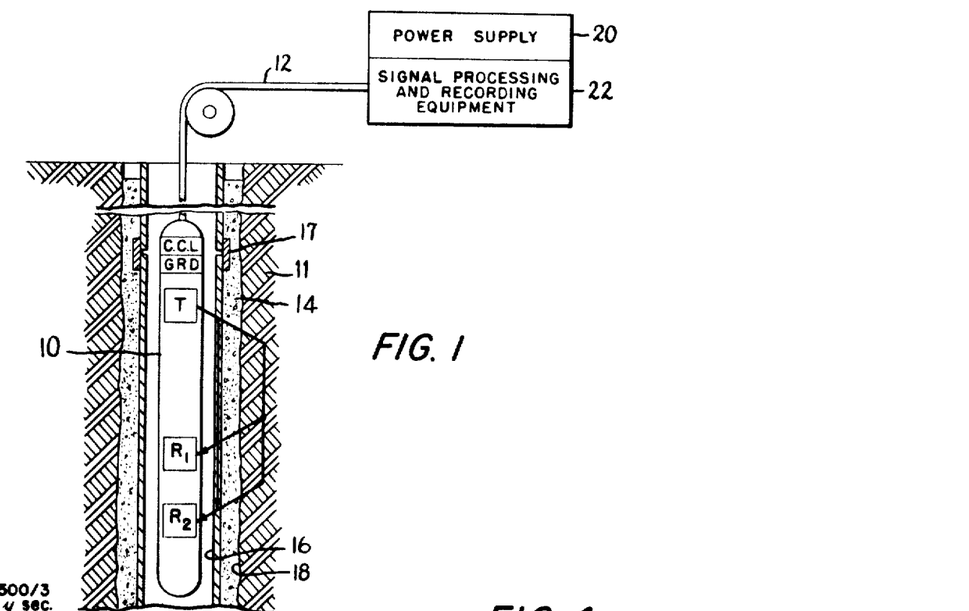
FIG. 1 is a schematic representation of a logging tool and borehole useful in explaining the invention.

FIG. 1 shows an acoustic logging tool, or sonde 10, suspended in a cased borehole in earth formations 11 by a conventional armored monocable 12. The tool itself is a unit which is designed for use with the acoustic transmission and reception of acoustic signals, a typical example of which may be found in U.S. Pat. No. 3,304,538. In connection with the description of this invention, it may be assumed that one of the main purposes for sounding the borehole with acoustic energy is to determine the presence and quality of the cement annulus 14 intermediate a steel casing 16 and the wall of the borehole 18. The casing 16 is generally constituted of a series of steel pipe sections coupled together by couplings or collars 17.

To energize the downhole electronic system, power is supplied through the monocable to the tool 10 from the uphole power supply 20, which may be either of the alternating current or direct current type. Information generated by the downhole electronic system, as will be explained in detail shortly, is transmitted over the cable conductor 12 and received by the processing and recording equipment 22 at the surface. A conventional winch, represented by the drum 23, raises and lowers the tool through the cased borehole.

When interrogating the cased borehole for an effective cement sheath between the cement annulus 14 and casing 16, the tool 10 is lowered to the lowermost depth from which information is desired and then slowly raised while repetitively energizing the transmitter T to send bursts of acoustic energy through the casing 16. This energy, in turn, follows the path provided by the casing medium and is received by the receivers $R_1$, $R_2$ suitably spaced from the transmitter at distances of, e.g., 3 feet and 5 feet, respectively. In this connection, it is understood that the tool 10 may be equipped with mechanical mechanisms for either centering the tool in the cased borehole or maintaining the tool in an eccentric position against the casing. The acoustic signals intercepted by the receivers $R_1$ and $R_2$ are attenuated according to the qualities of the bond of the cement annulus 14 to the casing.

Although it is not common practice to acoustically log the formations after the borehole has been cased, this is done on occasion, in which case processing of the electrical signals developed by the receivers $R_1$, $R_2$ in response to acoustic energy traversing the formations 11 and re-entering the borehole may be carried out in accordance with the principles disclosed in U.S. Pat. No. 3,174,577, issued Mar. 23, 1965 to L. M. Holley and assigned to the assignee of the present invention.

Figure 2:
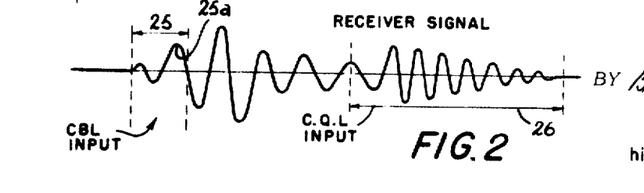
FIG. 2 is a graph of an electrical signal corresponding to acoustic energy received by the receivers in the typical tool of FIG. 1.

As previously set forth, a generally reliable indication of the presence or absence of bonding of the cement annulus to the casing is obtained from the sonic attenuation over a given casing length. In addition, the general quality of the cement bond, even though the bond is incomplete, may be obtained by an analysis of selected portions of the electrical signals developed by one or more receivers in response to the transmitted acoustic energy. In FIG. 2, a typical electrical signal developed by a receiver $R_1$ or $R_2$ in response to acoustic energy transmitted through the casing 16 is shown. As already known, it is preferred to employ the first significant arrival excursions 25 of the electrical receiver signal for determining whether or not the cement annulus 14 is bonded to the casing 16. Usually, this determination is made by examining the amplitude of a peak, such as 25a, of that portion of the signal. A sufficient bond will be indicated by a small amplitude of the excursion 25a, whereas the absence of a bond is indicated by a much larger amplitude. However, as discussed in copending application U.S. Ser. No. 653,299, of Frank P. Kokesh, the "Method and Apparatus for Cement Logging of Cased Boreholes," assigned to the assignee of this invention, a bond which is not complete may nevertheless satisfactorily function to prevent unwanted migration of fluids through the cement annulus from one longitudinal zone of the formations to another when the casing is perforated. In this instance, it is desirable to have a logging record of the quality of the cement bond (CQL).

In the above application of Frank P. Kokesh, it is proposed to utilize a later portion 26 of the receiver signal for deriving the CQL indication. This is accomplished by integrating the energy under the waveform of the portion 26 of the receiver signal, the energy curve at the output of an integrator in this case providing a useful indication of the cement bond quality. As best seen from FIG. 2, that portion of the receiver signal still contains peaks of substantial amplitude when compared to the earlier arriving portion 25 of the signal. Hence, the signal must be amplified less to retain significant information when using the later portion of the waveform, as in CQL logging. In most known logging tools, however, the gain of the downhole electronic circuitry is fixed, and this has restricted the usefulness of the tool where optimum amplification of several signals of varying amplitude levels is required. Thus, an optimum gain of the signals for CQL indications is not satisfactory for the development of a CBL input to the uphole processing equipment, particularly where cable attenuation is appreciable. Moreover, when acoustically logging formations for $\Delta t$, a higher amplification than for CQL inputs must be used, ordinarily requiring logging the borehole with a separate or modified tool, or dictating the necessity for extensive electrical controls exercised from the surface.

Figure 3:
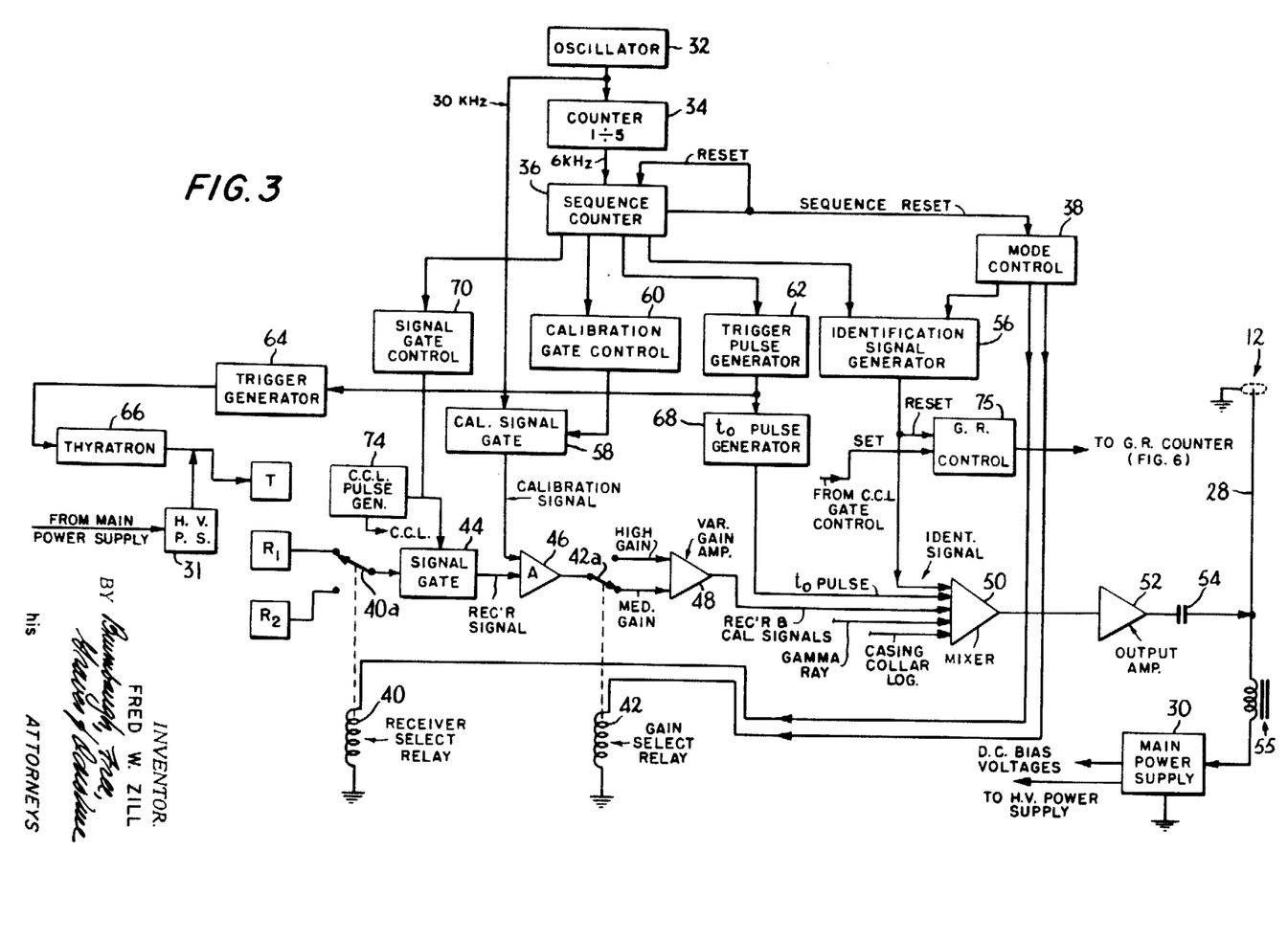
FIG. 3 is an electrical schematic block diagram of a downhole acoustic logging control system in accordance with the invention.

FIG. 3 shows schematically a system in accordance with the invention in which the amplification of the downhole electronic system, as well as the selection of two or more acoustic receivers, may be controlled automatically without attention from the operator of the processing equipment located at the surface. The system is compatible with systems using either one conductor or several conductors in the cable supporting the tool in the borehole, but for clarity, the monocable arrangement, with which the system is most advantageous, is shown.

Power is supplied to the downhole system of FIG. 3 over the central conductor 28 of the cable to a main power supply 30 which supplies d.c. bias voltages to the downhole electronic components, as well as power to a high voltage power supply 31. The entire downhole system is slaved, or synchronized, with the output of an oscillator 32 running at a convenient frequency, such as 30 KHz. The 30 KHz oscillator is, in turn, counted down by the unit 34 to produce a clock pulse output at 6 KHz. At this pulse frequency, intervals between the leading edges of the clock pulses occur every 500/3 microseconds and are used to drive a sequence counter 36, or shift register, producing a numerical binary count. The counter 36, separately and in conjunction with further units to be described, develops a number of control functions prescribing the desired order of events in respect of signal information to be transmitted to the surface over the shielded central conductor 28 of the cable 12. When the counter attains a predetermined count, it is reset to an initial count, representing the completion of one of several time intervals constituting an operational sequence.

Each count sequence, or time interval, determines, in addition, a certain mode of operation of the downhole electronic circuitry so that a number of operational modes is obtained from an equal number of count sequences of the unit 36. Specifically, in one mode of operation, the degree of amplification provided by the downhole system is set at one level for a time interval sufficient to generate and transmit all desired signals to the surface. During a following time interval, the degree of amplification is set at another level for the successive generation and transmission of another complete set of desired signals. In the first two such modes of operation, only one of the receivers (e.g., $R_1$) is operationally connected to the signal channel. For the following two modes of operation, the other receiver (e.g., $R_2$) is connected to provide a signal in response to the transmitted acoustic energy.

The resultant overall sequence of the system in the example given above for the various modes of operation is as follows:

| Mode | Signal From Receiver | Amplifier Gain |
|---|---|---|
| 1 | $R_1$ | Medium |
| 2 | $R_1$ | High |
| 3 | $R_2$ | Medium |
| 4 | $R_2$ | High |

Selection of the mode of operation in accordance with the foregoing sequence is carried out by the mode control unit 38 of which the output is connected to the coils of a normally de-energized receiver-select relay 40 and a gain-select relay 42. During mode 1 of the four-mode sequence, both relays 40, 42 are de-energized to connect the receiver $R_1$ to a signal gate 44 via the movable relay contact 40a, and to connect the output of an amplifier 46 to the medium gain input of a variable gain amplifier 48 through the movable contact 42a of the relay 42. During the second and fourth modes of the sequence, the mode control unit 38 energizes the gain-select relay 42 so that contact 42a is moved to couple the output of the amplifier 46 to the high gain input of the amplifier 48. During modes 3 and 4 of the sequence, the mode control unit 38 activates the receiver-select relay 40 to connect the receiver $R_2$ to the signal gate 44.

Signals amplified to the desired degree in the amplifier 48 are routed to the mixer amplifier 50, which also receives other independently generated signals, as will be discussed, and pass to the output amplifier 52 coupled to the conductor 28 by the d.c. blocking capacitor 54. For the purpose of isolating the power supply 30 from the higher frequency signals on the conductor 28, a choke 55 is provided between the power supply input and the point of connection to the conductor of the amplifier output.

During each of the foregoing modes, a number of independently generated signals are provided to the cable conductor in sequence, along with the electrical signal from the selected receiver. Each such independent signal occurs at a precise relative time in the mode time interval as determined by the count on the sequence counter 36. The first of such signals is an identification signal used in identifying the mode at the surface. The identification signal consists of a number of squarewave pulses corresponding to the operational mode, generated by an identification signal generator 56 and coupled to the mixing amplifier 50 prior to energization of the transmitter T. This signal passes through the amplifiers 50, 52 and is transmitted over the conductor 28 to the surface as the first signal to arrive during any single mode.

Following the identification signal, a calibration signal comprised of several cycles from the oscillator 32 is coupled to the amplifier 46 through a calibration signal gate 58. At a predetermined time in each mode, the calibration gate control unit 60 generates a gate signal of known duration to open the gate 58 and allow the 30 KHz oscillator signal to pass to the amplifier 46. The calibration signal, of which the frequency and amplitude are known, passes through all of the amplifiers (46, 48, 50 and 52) in the downhole system so that an accurate running indication of cable attenuation and distortion may be obtained at the surface.

Shortly after termination of the calibration signal burst, a trigger pulse generator 62 is activated. The pulse output from the latter energizes a trigger generator 64 that, in turn, operates a thyratron 66 to couple a short high voltage pulse from the power supply 31 to the transmitter T. Substantially simultaneously with the energization of the transmitter T, a $t_0$ pulse generator 68, coupled to the trigger pulse generator, provides adjacent narrow squarewave pulses of opposite polarity to the mixer amplifier 50. The $t_0$ signal furnishes a time reference at the surface corresponding to the pulsing of the transmitter T.

Throughout the foregoing train of events in each mode, the signal gate 44 remains closed so that any earlier arriving acoustic wave or noise detected by the selected receiver will not result in the premature transmission of any resultant electrical signals. The desired acoustic arrival time through the casing can be easily forecast by the known acoustic wave velocity in the casing material and the spacing between the transmitter and receivers, and the time for energization of the gate 44 set accordingly. At some predetermined time after generation of the $t_0$ pulse, therefore, the signal gate control unit 70 develops a gate signal to open the signal gate 44 and allow reception of the electrical signal developed by the receiver in response to only the desired acoustic energy.

Figure 4:
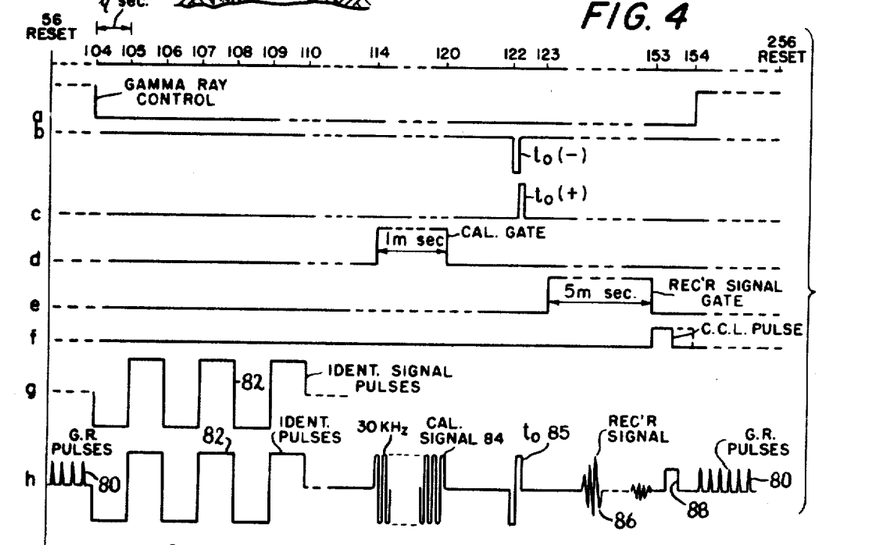
FIG. 4 is a series of graphs of various electrical signals developed in the system of FIG. 3.
Figure 6:
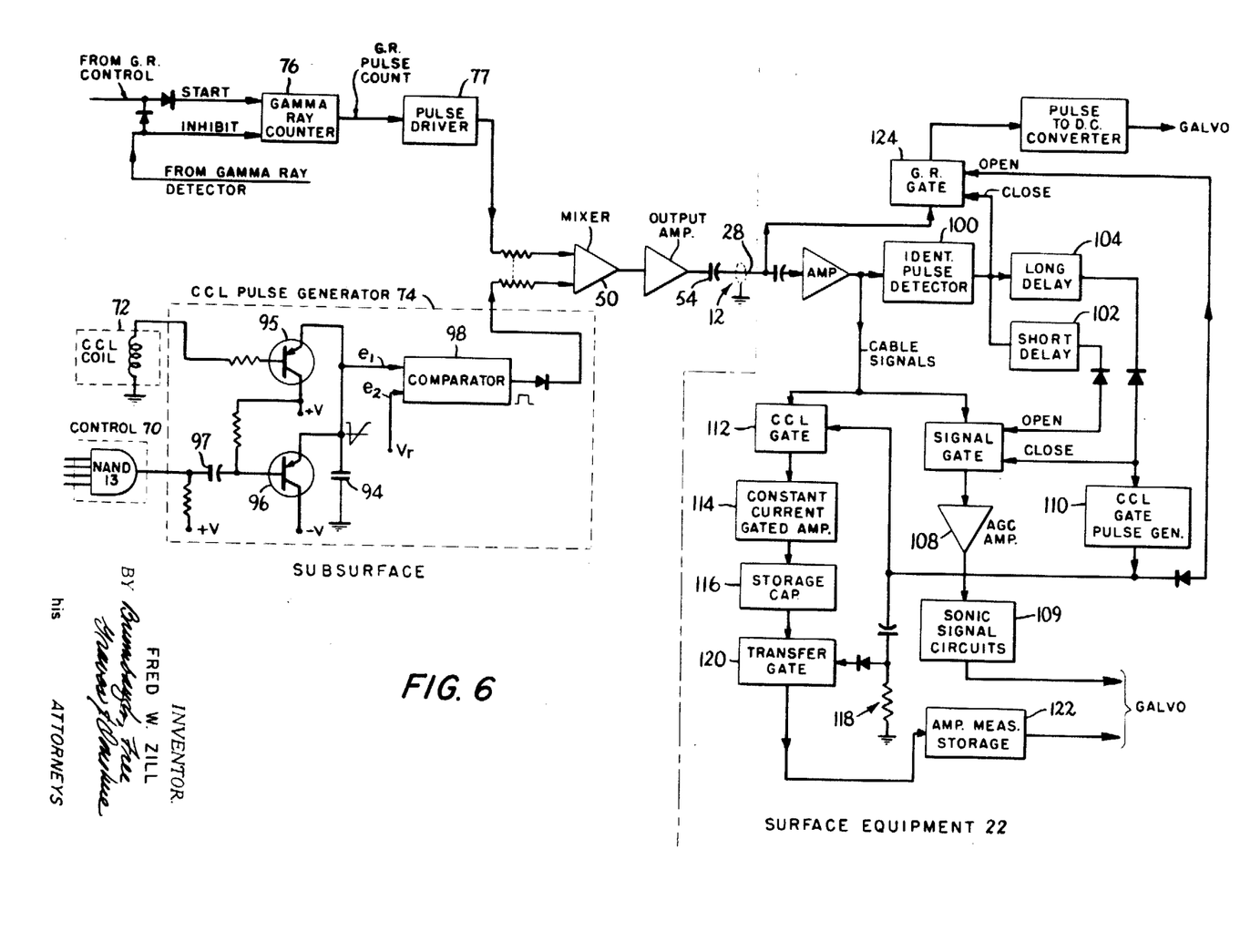
FIG. 6 is a schematic block diagram of a portion of the downhole system of FIG. 3, together with equipment compatible with the FIG. 3 system.

In logging operations of the nature described, it is common practice to detect both gamma radiation emanating from the formations and the location of the casing collars. To this end, the logging tool 10 is provided with a conventional gamma ray detector G.R.D. and casing collar detector 72 (FIG. 6). After the signal gate 44 has closed following reception of the electrical signal from the selected receiver, any casing collar locator (CCL) pulse (FIG. 4f) from the CCL generator 74 is allowed to pass to the mixer 50. The CCL pulse generator 74 will be described more fully at a later point, but it may be noted that the CCL pulse is a variable-width pulse representing the strength of the signal from the casing collar locator coil.

Following the collar pulse, the gamma ray control unit 75 provides a signal to initiate a pulse train representative of gamma radiation. This pulse train may be obtained directly from the gamma radiation detector, or from a pulse generator 76 (FIG. 6) producing a number of pulses proportional to the total radiation sensed during each mode. The gamma ray pulses from the unit 76 are coupled to the mixer 50 through a suitable pulse driver 77, and are available until generation of the identification signals during the next consecutive mode. At this time, the gamma ray control unit 75 receives a pulse from the identification signal generator 56 to reset the unit 75 and terminate transmission of the gamma radiation pulse train.

The foregoing sequence of events is then repeated for the subsequent mode and every mode thereafter, the only difference residing in the distinct identification signals. In the system described, the sequence counter 36 is recycled, or reset, after each 200 pulses at the 6 KHz pulse rate from the counter 34. In other words, the duration of each mode in the four-mode operational sequence of the downhole equipment is (200 × 500/3 $\mu$ sec = 1/30 second). This situation is depicted in FIG. 4, showing a timing diagram for the signal occurrences during one mode. Graph (a) indicates the counts of particular interest during each mode.

Graph (h) of FIG. 4 gives a summary of the signal output of the amplifier 52 during a single mode of the sequence. The pulse train 80 representing gamma radiation overlaps adjacent modes during an initial time segment, allowing for switching of the gain-select and receiver-select relays. The particular mode in the operational sequence is first identified by the number of squarewave pulse cycles 82, followed by a number of cycles 84 of the 30 KHz signal from the oscillator 32. Next, the transmitter T is pulsed and a narrow $t_0$ pulse 85 simultaneously generated. A short predetermined time thereafter, the receiver signal gate opens and the receiver signal 86 passes through the amplification channel to the output cable. Thereafter, the CCL pulse generator is enabled to generate a squarewave pulse 88 if a casing collar is detected, and finally the gamma radiation pulse train appears for the remaining period of that mode and the beginning period of the next mode until the first identification signal pulse is generated.

If it is assumed that CBL or $\Delta t$ information is desired during modes 2 and 4 and that CQL is desired during modes 1 and 3, the sequence of events provided by the FIG. 3 system will be recognized as correct. In modes 1 and 3 the gain-select relay 42 selects the medium gain input to the amplifier 48 so that optimum amplification of the later portion 26 (FIG. 2) of the receiver signal is obtained. Saturation and resultant loss of signal resolution is thus prevented by the lower gain input. For CBL information, however, when the amplitude of the desired portion of the receiver signal is low, the gain select relay 42 couples the receiver signal to the high gain input of the amplifier 48, and any overdriving or saturation of the amplifier during the later portion of the signal will have no degrading effects on the initial portion of the signal.

In connection with FIG. 3 it was explained that, except for a distinct characteristic of the identification signal, the train or sequence of electrical signals during each mode is identical and that the duration of each mode is determined by the time it takes the sequence counter 32 to attain a given count. At that time, it will be recalled, the sequence counter is reset or recycled to begin a successive count in an identical manner. When the counter recycles at the end of its first count, a reset signal pulse is supplied to the mode control unit 38 to place this unit in a condition representing the second mode. Bearing the foregoing in mind, the operation of the FIG. 3 system will be explained in more detail with reference to FIG. 5 and the waveforms of FIG. 4. Conventional binary digital components are used throughout the system and, accordingly, no explanation of those components is given.

Figure 5:
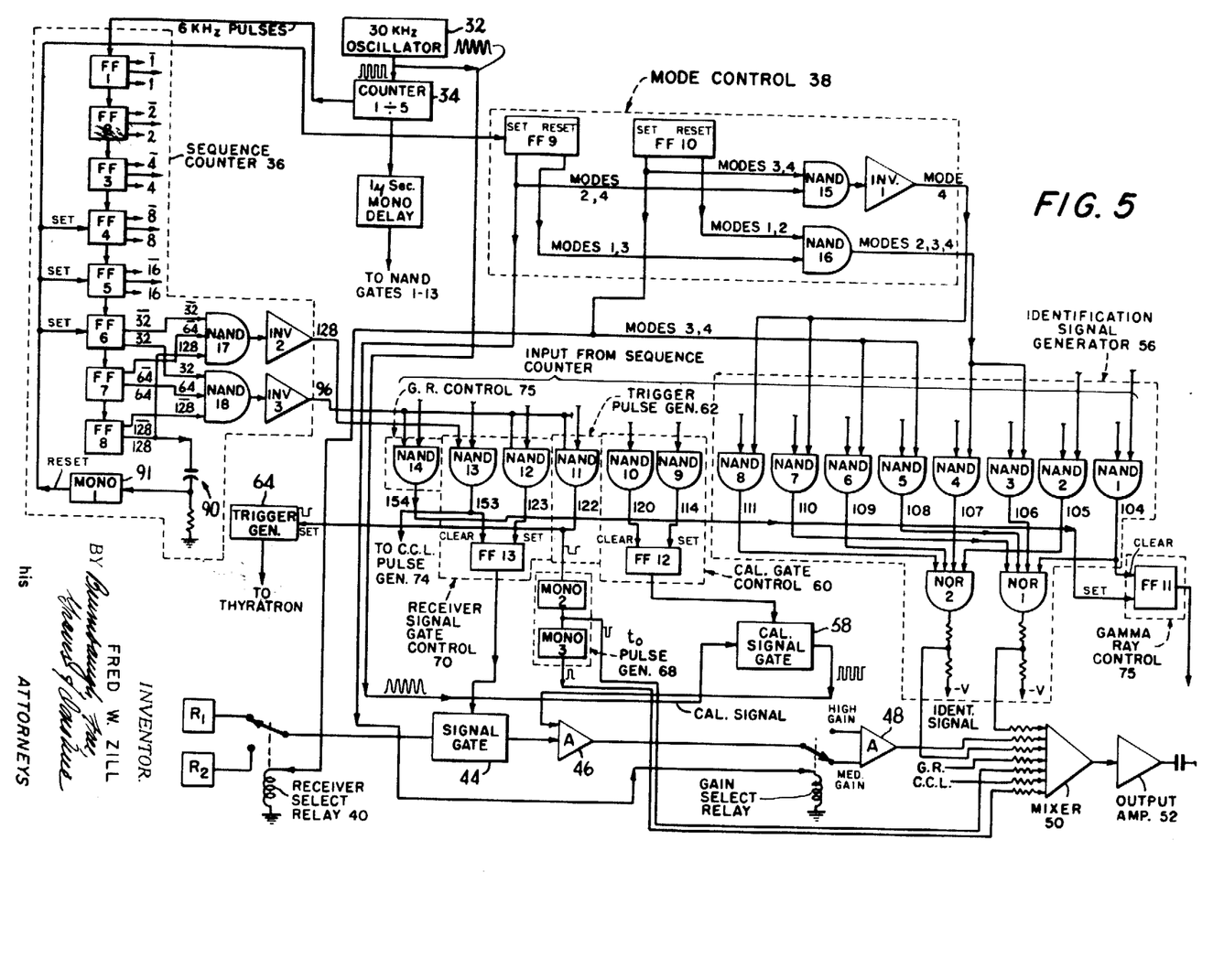
FIG. 5 is a detailed electrical schematic block diagram of the system shown in FIG. 3.

The sequence counter 36 is comprised of eight flip-flop units FF1 ... FF8 providing binary outputs 1, $\overline{1}$ ... 128, $\overline{128}$, where the bar indicates "not". The counter is arranged as a conventional shift register receiving the 6 KHz pulses from the unit 34. At a count of 256 the output of FF8 goes from a 1 state to the 0 condition, and the trailing edge of the output pulse is differentiated in the circuit 90 to provide a sharp pulse to a monostable multivibrator (MONO) 91. The latter develops an output pulse that is applied to FF4, FF5 and FF6 to set those units to an initial 1 condition. The pulse output of MONO unit 91 is also applied to the mode control unit 38, as will be later discussed. As a result of the application of the reset pulse to units FF4, FF5 and FF6, the sequence counter begins each new counting sequence at a registered count of 56. Reset occurs again when the counter 36 attains a count of 256, or at a count of 200 following the previous reset. The binary outputs from the sequence counter 36 are fed to a decoder unit comprised of NAND gates 1–14 to provide desired control functions. For convenience, combinations of those NAND gates have been outlined by broken lines to show their associations with various units in FIG. 3.

MODE CONTROL UNIT

The mode control unit 38 includes two flip-flops FF9, FF10, the first of which is set by the pulse output from the monostable multivibrator 91 at the 256 count. During the first mode, a zero condition obtains at the set outputs of FF9 and FF10 connected to the relays 42, 40 respectively, so that both of those relays are de-energized in accordance with the mode sequence earlier outlined. When the first reset signal is received by FF9 at the beginning of the second mode, this flip-flop is set, and a 1 condition appears at the gain-select relay 42 to change the gain of amplifier 48 from a medium gain to high gain. At the beginning of the third mode, the reset pulse places FF9 again in its initial condition, and provides a pulse to FF10 such that a 1 appears at the set output of the FF10. This output is connected to the receiver-select relay 40 so that the receiver $R_2$ is coupled to the signal gate 44 in favor of receiver $R_1$, which becomes decoupled from the signal channel. Since at this point there is a 0 at the set output of FF9, the gain-select relay 42 is de-energized and the first electrical signal from receiver $R_2$, amplified in the unit 46, is applied to the medium gain input to the variable gain amplifier 48. When the mode control 38 receives the next reset pulse at the beginning of the fourth mode of the sequence, the gain-select relay 42 is again energized, while the receiver-select relay 40 remains energized. At the end of the fourth mode, the next reset pulse from the sequence counter resets FF10 to its initial condition and removes the 1 at the set output to de-energize the receiver-select relay 40. Thereafter the sequence in the mode control unit 38 repeats.

The mode control unit also includes a pair of gates NAND 15, NAND 16. NAND 15 receives the set outputs of FF9 and FF10 so that its output is 0 during mode 4 only. This output is inverted in polarity by INV 1 to yield a positive output during the last mode of the sequence. NAND 16, on the other hand, receives a 1 from both reset outputs of FF9 and FF10 during mode 1 only; therefore, a 0 condition occurs at the output of NAND 16 during mode 1, whereas a 1 condition is present at the output during modes 2, 3 and 4.

IDENTIFICATION SIGNAL GENERATOR

NAND gates 1–8, together with gates NOR 1 and NOR 2, comprise the identification signal generator for producing pulse outputs in the format shown in FIG. 4g. As noted earlier, it is desired to have a distinct identification pulse to identify the particular mode in which the downhole equipment is operating. The FIG. 5 logic system operates to produce a single squarewave cycle at the beginning of the first mode, two squarewave cycles at the beginning of the second mode, three squarewave cycles at the beginning of the third mode and four squarewave cycles at the beginning of the fourth mode.

At a count of 104 all inputs to NAND 1 are at the 1 level to produce a negative output which is fed to the input of NOR1 and the CLEAR input of FF11 in the gamma ray control unit 75. FF11, when set, develops a start control signal for the gamma ray counter 76 (FIG. 6), and provides an inhibit control signal when reset to block further gamma radiation transmission to the mixer amplifier 50. NOR 1 employs negative logic so that its output is negative whenever there is a negative input. That negative output is fed to the mixer amplifier 50 through a suitable input resistor to provide the negative excursion of the first squarewave cycle of the identification signal. At a count of 105 the output of NAND 1 returns to the positive level and the output of NAND 2 is negative. This, in turn, is fed to NOR 2 whose output goes from a negative to positive level whenever any of its inputs are negative. This event, then, applies the positive half of the first squarewave cycle of the identification pulse to an input resistor of the mixer 50.

A similar sequence of events occurs during the second mode, or subcycle, in respect of NAND 3 and NAND 4 to provide the second squarewave cycle between counts 106 and 108. NAND 5 and NAND 6, at counts of 108 and 109, respectively, develop the negative and positive excursions of the third squarewave cycle, whereas NAND 7 and NAND 8 develop the negative and positive excursions of the fourth squarewave cycle of the identification signal at counts of 110 and 111, respectively. As developed earlier, the output of NAND 16 in the mode control unit 38 is 0 during the first mode, and is coupled to inputs of NAND 3 and NAND 4 so that those gates are inhibited during the first mode only. Similarly, gates NAND 5 and NAND 6 are inhibited during modes 1 and 2 by a 0 at the set output of FF10 in the mode control unit, and gates NAND 7 and NAND 8 are inhibited for all modes except mode 4 by reason of the input supplied from INV 1. The outputs of NAND 3, NAND 5 and NAND 7 are supplied to NOR 1, whereas the outputs from NAND 4, NAND 6 and NAND 8 are supplied to NOR 2. In this manner, NOR 1 develops all negative half-cycles of the identification signal and NOR 2 provides the positive halves of the squarewave identification signal.

CALIBRATION CONTROL GATE

The generation of the calibration gate control signal (FIG. 4d) to open the calibration signal gate 58 is the next function of the downhole equipment. Gates NAND 9 and NAND 10 together with FF12, comprising the calibration gate control 60, provide this function. At a count of 114 (two counts after termination of the longest identification signal) FF12 receives a set pulse from NAND 9 to open the calibration signal gate 58. Six counts later, when the count reaches 120, FF12 is cleared by a negative pulse at the output of NAND 10 to again close the calibration signal gate. When the gate 58 is open, the 30 KHz oscillator signal is passed to the amplifier 46, as previously explained, and is thereafter blocked when the gate closes. A predetermined number of cycles of the 30 KHz signal thereby passes to the signal channel.

$t_0$ PULSE GENERATOR

Once the 30 KHz calibration signal has been gated to the signal amplifier channel to provide a reference for the surface processing equipment, the transmitter T is triggered. This is accomplished by NAND 11, comprising the trigger pulse generator 62, which at a count of 122 (two counts after the calibration signal gate closes) provides a negative level to the trigger generator 64. This, in turn operates the thyratron 66 (FIG. 3) to energize the acoustic transmitter. The output of NAND 11 is also supplied to the first of two monostable multibrators MONO 2, MONO 3 making up the $t_0$ pulse generator 68. Upon sensing the negative-going level at the output of NAND 11, MONO 2 develops a negative pulse of short duration, which is supplied to an input resistor of the mixer 50, as seen in FIG. 4$b$. MONO 3 is triggered by the trailing edge of the pulse from MONO 2 to generate a positive-going pulse of equal duration (FIGS. 4$b$ and 4$c$) which is applied to another input resistor of the mixer 50. By the short duration of the $t_0$ pulse when it arrives at the surface, proper functioning of the trigger circuits and the precise time of transmitter firing can be ascertained.

SIGNAL GATE CONTROL

Following the pulsing of the transmitter, the signal gate 44 is opened to allow the receiver signal to pass to the amplification channel. This function is accomplished by gates NAND 12, NAND 13 and FF13 of unit 70 whose output (FIG. 4$e$) is applied to the signal gate 44 precisely one count (500/3 microseconds) after the transmitter is pulsed. The output of NAND 12 transfers to the negative level at count 123, setting FF13 and opening the signal gate 44. The gate 44 is allowed open for 30 counts (5 milliseconds), a period sufficient to encompass all desired parts of the selected receiver signal, after which the output of NAND 13 goes to its negative level and clears FF13. This operation closes the signal gate 44.

Since the development and transmission of all components of the signal train in the mode is complete upon closing of the signal gate 44, the cable conductor is free to receive CCL and GR information.

CCL PULSE GENERATOR

Immediately following termination of the gated receiver signal, at count 153, the CCL pulse generator 74 is activated. To this end, the generator 74 receives the pulse output from the NAND 13 gate, which has a duration of one count (terminating at count 154). Referring to FIG. 6, the CCL pulse generator consists of a storage capacitor 94 which is normally charged positively by the current through the transistor 95, biased as a constant current generator. Transistor 96 constitutes a first discharge amplifier of which the emitter is also coupled to the storage capacitor 94. When the negative pulse at the output of NAND 13 (in the signal gate control 70) appears, it is momentarily coupled by the capacitor 97 to the base of the normally off transistor 96 and overrides the positive bias +V connected to each side of the capacitor 97. This action renders transistor 96 momentarily conductive to rapidly pull the storage capacitor 94 to essentially the negative bias potential (−V). The potential on the capacitor then returns to the positive potential by a constant current supplied from the transistor 95.

The current through the constant current transistor 95 is determined by the instantaneous voltage signal developed across the coil of the conventional CCL unit 72, connected to the base of the transistor. The voltage function across the capacitor 94 is therefore a ramp whose slope depends on the CCL signal amplitude. That signal is fed to a comparator 98 which compares the ramp voltage with a reference source $V_r$. When the two inputs to the comparator 98 are unequal (e.g., at the lowest ramp potential) the output of the comparator is positive (1); when the inputs become equal as the capacitor returns to its positively charged value, the output falls to zero, thereby ending the CCL pulse. In general, the width of the CCL pulse (FIG. 4$f$) is appreciably less than the counting pulse period (500/3 $\mu$ sec) and typically falls between 10 and 150 microseconds. In any event, when the NAND 13 gate output returns to the positive (0) level, the first discharge transistor 96 can no longer conduct and full positive bias is returned to the capacitor 97 and transistor base to once again establish the quiescent condition.

SURFACE EQUIPMENT

At the surface, the transmitted information signals are easily separated by sequential gating techniques. After amplification, the composite signal train arriving from the downhole system over the cable conductor 28 is applied to an identification pulse detector 100 which provides a suitable pulse output upon arrival of the first identification pulse (FIG. 4$g$). Those pulses, it will be recalled, are of uniform width and unique in format so that any suitable detection means can be employed. The output of detector 100 simultaneously energizes two monostable multivibrator delay units 102, 104. Delay unit 102 provides a short delay pulse corresponding to the time period between the identification and signal gate signals (FIGS. 4$g$ and 4$e$). The trailing edge of the short delay pulse is used to open the surface signal gate 106 to pass the acoustic receiver signal to the agc amplifier and sonic signal circuits 109, which may be of the type disclosed, for example, in the above-mentioned copending application Ser. No. 653,299.

The output pulse from the long delay 104 terminates about 5 milliseconds (the width of the downhole signal gate pulse) after the short delay pulse to close the signal gate 106 and energize a CCL gate pulse generator 110. However, this period may be larger or shorter, if desired, and may occur at such time to pass the identification pulses to the signal gate 106. The CCL gate pulse corresponds in duration to the time period during which the downhole pulse generator 74 produces the CCL pulse, and opens a CCL gate 112. Thus, the portion of the amplified cable signals containing the CCL pulse is gated to a constant current amplifier 114 which charges a storage capacitor 116 at a constant rate for the duration of the CCL pulse. The voltage stored in the capacitor 116 is therefore proportional to the transmitted CCL pulse width.

When the CCL gate pulse terminates, the output change of generator 110 is sensed by the RC and diode circuit 118 to transfer the stored charge (voltage) via transfer gate 120 to an amplitude measuring storage circuit 122, which holds the transferred charge (voltage) between samples but transfers rapidly to any new applied value. The storage capacitor 116, on the other hand, decays between successive samples so that each new CCL pulse is registered as a voltage proportional to CCL pulse width.

Simultaneously with energization of the transfer gate 120, the GR gate 124 is set to the "open" condition to allow the gamma radiation signal to pass to a standard pulse-to-direct current voltage converter. The GR gate closes upon receipt of the next set of identification pulses by applying the output of the detector 100 to the reset input of the gate. The foregoing sequence of the surface equipment corresponds to the downhole sequence at which the various information signals are produced and transmitted to the surface. In this connection, it is apparent that similar logic and means can be implemented for obtaining the calibration signal, or for initiating surface equipment operation with the $t_0$ pulses, for example, rather than with the identification signal.

The foregoing sequence of events for both the downhole system and surface equipment is repeated during each subcycle or mode of operation of the system, with the exception that the identification pulse format is unique for each of the four subcycles in the sequence.

Although the system has been described with reference to only four modes or subcycles of operation, it is quite apparent that the logic may be extended to include further subcycles or modes. For example, the amplifier 48 may be equipped for a low gain operational mode. For a variable density record at the surface, for example, it is desirable that the electrical signal from the receivers be amplified to a smaller degree than required for either CBL or CQL information. Accordingly, one or more subcycles may be added to the sequence to provide a lower degree of amplification. It is also apparent that more than one transmitter may be employed, such as where $\Delta t$ logging of the type disclosed in U.S. Pat. No. 3,304,537 to R. J. Schwartz, issued Feb. 14, 1967, is carried out.

One of the most apparent advantages of the invention is its automatic operation without the necessity of transmitting any control signals over the monocable from the surface. In this regard, the system is particularly beneficial for obtaining both CBL and CQL information where a higher degree of signal amplification is required for the satisfactory extraction of CQL information and, moreover where it is highly desirable to develop an electrical signal from a far receiver as the CQL input and a near receiver for a CBL input.

Although the invention has been described with reference to a specific preferred embodiment thereof, it is apparent that many modifications and variations may be made within the skill of the art. Accordingly, all such modifications and variations are intended to be included within the scope of the appended claims.

I claim:

1. In apparatus for acoustically logging a borehole including a casing cemented in a borehole to obtain indications concerning the cement bonding, a downhole signal transmission system, comprising:
   a logging tool movable through the borehole, including at least one transmitter for sending acoustic energy through the borehole and casing and at least one receiver spaced from the transmitter for developing an electrical signal in response to each transmission of acoustic energy received thereby;
   means for repetitively energizing the transmitter at preselected time intervals to effect corresponding repetitive transmissions of acoustic energy;
   means coupled to the receiver for amplifying each such electrical signal;
   means for coupling the amplified signals to a conductor for transmission to the earth's surface; and
   means synchronized with the transmissions of acoustic energy for sequentially controlling the degree of amplification of each such electrical signal by the amplifying means to obtain in each given sequence at least two electrical signals which have been amplified to different degrees.

2. Apparatus according to claim 1, further comprising:
   a second receiver spaced from the transmitter and first receiver for developing in a like manner an electrical signal in response to each transmission of acoustic energy received thereby;
   switch means connected to the first and second receivers for selecting at least one electrical signal from each receiver for passage to the amplifying means; and
   means synchronized with the transmission of acoustic energy for controlling the selection of electrical signals by the switch means.

3. Apparatus according to claim 2, in which:
   the switch control means is operative to connect at least one electrical signal from each receiver to the amplifying means during each sequence.

4. Apparatus as defined in claim 3, in which:
   the switch control means and sequential control means operate in synchronized order to provide sequentially to the conductor two signals from each receiver at respective said degrees of amplification during each sequence.

5. Apparatus according to claim 1, further comprising:
   means for generating a timing pulse in substantially simultaneous synchronization with each transmission of acoustic energy, the timing pulse having a characteristic separable from the electrical signals from the amplifying means;
   and means for coupling the timing pulse to the conductor for transmission to the surface.

6. A logging tool for acoustically logging a cased borehole and including:
   means for emitting and detecting acoustic energy in a borehole and for generating first electrical signals representative of the time of emission of acoustic energy and for generating second electrical signals representative of the waveform of detected acoustic energy;
   means for repetitively acutating said emitting means at preselected time intervals defining a signal processing sequence;
   means for detecting radiation emanating in a borehole and providing third electrical signals representative of the detected radiation;
   means for detecting couplings in a well casing and providing fourth electrical signals representative of the detection of such couplings; and
   means for sequentially transmitting to the surface said first, second, third and fourth signals during each time interval, including means for varying an electrical characteristic of one of said signals during at least one of said time intervals.

7. Apparatus according to claim 1, further comprising:
   means for producing an electrical calibration signal having a preselected amplitude; and
   gating means for periodically coupling the calibration signal to the conductor during time periods exclusive of the presence of the amplified electrical signals on the conductor.

8. Apparatus as set forth in claim 7, in which:

the calibration signal is a periodic waveform of fixed predetermined frequency.

9. Apparatus according to claim 8, further comprising:

second gating means connected intermediate the receiver and the amplifying means for connecting each electrical signal to the amplifying means for a limited period of time following each transmission of acoustic energy.

10. Apparatus according to claim 1, further comprising:

means for generating a signal indicative of the presence of a coupling between adjacent sections of the borehole casing, and means responsive to the sequential control means for coupling said pulse to the conductor in time displaced relation to the connected electrical signal during each time interval.

11. Apparatus according to claim 10, in which:

the apparatus includes means for producing a coupling signal of amplitude representing the proximity of a casing coupling; and the coupling-indicative signal generating means produces a pulse having a width proportional to the intensity of the coupling signal.

12. Apparatus according to claim 10, in which the coupling-indicative pulse generating means comprises:

charge storage means;

current source means connected to charge the charge-storing means to a given value at a rate proportional to the current therefrom; and means for varying the value of the current from the current source means in accordance with proximity of a casing coupling.

13. Apparatus according to claim 12, in which the coupling-indicative means further comprises:

means responsive to said sequential control means for rapidly conditioning the charge storing means to a reference value.

14. Apparatus according to claim 13, in which the coupling-indicative means further comprises:

comparator means connected to the storage means for generating an output pulse having a duration proportional to the time period between the attainment of the reference and given values of charge by the storage means.

15. Apparatus according to claim 10, further comprising surface means including:

means coupled to the cable conductor for developing a control signal in predetermined time reference to the arrival at the surface of the amplified electrical signal; and gating means responsive to the control signal for extracting a selected portion of the signals on the cable conductor including the coupling-indicative signal.

16. In a borehold logging system, apparatus for generating a signal representative of the proximity of a coupling between adjacent sections of a casing lining the borehole, comprising:

charge-storing means;

current source means connected to charge the charge-storing means to a given value at a rate proportional to the current therefrom;

coupling detector means for varying the value of the current from the current source means in accordance with the proximity of a casing coupling;

means for rapidly conditioning the charge storing means to a reference value; and comparator means connected to the storage means for generating an output pulse having a duration proportional to the time period between the attainment of the reference and given values of charge by the storage means.

17. In apparatus for acoustically logging an earth borehole including a casing defining an annulus for a bonding material between earth formations and the casing to obtain indications concerning the bonding of the casing thereto, a downhole signal transmission system, comprising:

a logging tool movable through the borehole, including at least one transmitter for sending acoustic energy through the borehole and casing and at least one receiver spaced from the transmitter for developing an electrical signal in response to each transmission of acoustic energy received thereby;

a clock pulse generator for supplying a train of pulses;

a sequence counter responsive to successive pulses from the clock pulse generator for providing a plurality of numerical control signals corresponding to respective numerical counts of the pulses in a given time interval;

amplifying means coupled to the receiver for amplifying the electrical signals from the receiver;

means operative with said amplifying means to provide at least two degrees of amplification thereby; and mode control means responsive to one of said numerical control signals for controlling said last-named means to provide at least two electrical signals amplified to different degrees during respective consecutive time intervals comprising a given sequence.

18. Apparatus as defined in claim 17, further comprising:

a second receiver spaced from the first receiver, control means for selectively coupling a different one of the receivers to the amplifying means in each time interval and in a predetermined order during each sequence.

19. Apparatus as set forth in claim 18, further comprising:

means responsive to at least one numerical control signal corresponding to a first given count of the counter during each time interval for generating a timing signal to energize the transmitter.

20. Apparatus according to claim 19, further comprising:

means for coupling the timing signal to the conductor.

21. Apparatus in accordance with claim 20, in which:

the timing signal means generates a narrow positive pulse portion and a narrow negative pulse portion, relative to a signal reference level.

22. Apparatus as defined in claim 19, further comprising:

gating means responsive to at least one numerical control signal corresponding to a predetermined count of the counter greater than the first count for selecting at least a portion of a respective electrical signal during each time interval.

23. Apparatus as defined in claim 22, further comprising:

means for generating a calibration signal of preselected amplitude and frequency, and calibration gating means responsive to a numerical control signal corresponding to a fourth count of the counter for connecting the calibration signal to the conductor in time displaced relation to the timing and selected electrical signals.

24. Apparatus in accordance with claim 22, in which the logging tool includes means for providing an electrical signal representative of radiation in the formations, the apparatus further comprising:

means responsive to at least one numerical control signal corresponding to a distinct count of the counter for connecting the radiation signal to the conductor in time displaced relationship to the other connected signals during each time interval.

25. Apparatus according to claim 18, further comprising:

means responsive to at least one numerical control signal for setting the counter to a predetermined initial count at the end of each time interval.

26. Apparatus according to claim 25, in which:

the mode control means is responsive to the numerical control signal which sets the counter to the initial count to develop a unique set of electrical signals during each time interval of the sequence.

27. Apparatus according to claim 19, further including surface detection equipment comprising:

detector means coupled to the cable conductor for developing a control signal having a predetermined time reference to said timing signal; and gating means responsive to the control signal and coupled to the conductor for extracting a selected portion of the signals on the conductor containing an amplified electrical signal from the downhole amplifying means.

28. Apparatus as defined in claim 27 in which the detector means includes:

pulse detection means operable to develop a pulse output in response to a signal on the conductor preceding the arrival of the amplified electrical signal; and first and second delay means responsive to the pulse output of the detection means for generating respective first and second pulses comprising said control signal, said first and second pulses being displaced in time.

29. Apparatus according to claim 27, further comprising:

radiation detector means carried by the logging tool and responsive to radiation emanating from the formations to provide signals representing such radiation; and means coupled to the sequence counter means for coupling such radiation signals to the cable conductor in response to a given numerical control signal.

30. Apparatus according to claim 29, further comprising:

second gating means at the surface responsive to the first gating means for separating from the cable signals the radiation signals, the second gating means being operative in time referenced relation to the arrival at the surface of said timing signal.

31. A logging tool for acoustically logging a borehole comprising:

at least one transmitting means for sending acoustic energy into the media proximate to the transmitting means;

first acoustic receiving means spaced from said transmitting means and adapted for developing a first electrical signal in response to selected transmissions of acoustic energy received thereby;

second acoustic receiving means spaced from said transmitting means and said first acoustic receiving means and adapted for developing a second electrical signal in response to selected transmissions of acoustic energy received thereby;

means for detecting radiation emanating from media proximate to said logging tool and providing third electrical signals representative of the detected radiation;

means for repetitively actuating said transmitting means at preselected time intervals and generating a fourth electrical signal representative of the time of actuation thereof;

means for sequentially processing said first, second and fourth electrical signals and said first, third and fourth electrical signals during alternate ones of said preselected time intervals; and local timing means in said logging tool for controlling, respectively said actuating means and said sequential processing means.

32. Apparatus according to claim 31, further including:

means for generating a fifth electrical signal adapted to enable the identification of the alternate ones of said preselected time intervals during which said first, second and fourth electrical signals are sequentially processed from those during which said first, third and fourth electrical signals are sequentially processed.

33. Borehole logging apparatus, comprising:

a logging tool movable through the borehole and including mutually spaced energy transmitting means and receiving means for emitting and detecting energy, respectively;

means for repetitively energizing the transmitting means at preselected intervals to effect corresponding emissions of energy and thereby to develop by the receiving means for each thereof an electrical signal representative of energy received;

signal processing means synchronized with the emissions of energy for varying in a predetermined manner that is different for successive time intervals in a predetermined sequence of time intervals the electrical characteristics of said electrical signals; and sequence control means in the tool developing control signals for establishing in the processing means a signal processing sub sequence for each successive time interval in said predetermined sequence of time intervals, each such processing sub sequence comprising plural time intervals, and each such sub sequence effecting a repetitive set of electrical signal characteristic varying operations by the signal process-ing means.

34. Borehole logging apparatus, comprising:

a logging tool movable through the borehole and including mutually spaced energy transmitting means and receiving means for emitting and detecting energy, respectively;

means for repetitively energizing the transmitting means at preselected intervals to effect corresponding emissions of energy and thereby to develop by the receiving means for each thereof an electrical signal representative of energy received;

signal processing means synchronized with the emissions of energy for varying in a predetermined manner that is different for different time intervals in a predetermined sequence the electrical characteristics of said electrical signals;

sequence control means in the tool developing control signals for establishing in the processing means a signal processing sequence comprised of plural time intervals, each sequence effecting a repetitive set of electrical signal characteristic varying operations by the signal processing means;

means synchronized with the repetitive energizing means for generating an identification signal that is distinct from said electrical signal and different for at least consecutive intervals of said sequence;

an electrical output cable for the tool; and means for coupling the identifying and electrical signals to the output cable in sequence.

35. In a borehole logging apparatus, the combination of:

a logging tool movable through the borehole including means for developing plural logging signals and an electrical identification signal preceding the plural logging signals and having electrical characteristics differing from the characteristics of the logging signals thereby to be distinguishable therefrom;

an output conductor for conveying the identification and plural logging signals to the surface; and surface signal processing means including (a) at least two signal channels for carrying the respective plural logging signals, and (b) means responsive to the identification signal for sequentially directing individual ones of the plural signals to separate ones of the signal channels.

36. Apparatus as defined in claim 35, in which the logging signal directing means includes:

first and second controllable signal gating means each receiving the plural logging signals connected respectively to a different one of the signal channels; and gate control means for sequentially activating the first and second gating means in response to the identification signal.

37. Apparatus as set forth in claim 36, in which:

the gate control means includes means for detecting the arrival at the surface of the identification signal to produce at least one signal operable to activate the first gating means and thereby pass one of the plural logging signals to one of the signal channels.

38. Apparatus according to claim 37, further comprising:

first delay means interposed between the identification signal detecting means and the first gating means to delay activation of said gating means until a specified time period following arrival of the identification signal.

39. Apparatus according to claim 37, in which the gate control means further includes:

delay means responsive to said one signal for producing a gate control signal operable to deactivate the first gating means a preselected time period following arrival of the identification signal.

40. Apparatus according to claim 39, in which:

the second gating means is responsive to the gate control signal to be activated thereby following deactivation of the first gating means.

41. Apparatus as defined in claim 40, in which:

the second gating means is activated for a predetermined time period in response to the gate control signal.

42. Apparatus as set for in claim 41, further comprising:

means responsive to the gate control signal for generating a pulse having said predetermined period, the second gating means receiving said pulse.

43. Apparatus according to claim 36, further comprising:

means in said first signal channel for storing an electrical signal in response to and representing the logging signal passing to said channel upon activation of the first gating means;

a first channel output conductor; and means interconnected between said channel output conductor and the storing means and responsive to the gate control signal for transferring to said channel output conductor said electrical signal in timed relation to the occurrence of the gate control signal.

44. A logging tool for acoustically logging a cased borehole and including:

at least one transmitter and spaced apart receiver means for developing first and second electrical signals representative of the emission and detection of acoustic energy;

variable gain amplifying means for providing different gain amplification;

means for selectively coupling one of said receiver means to said gain amplifying means;

means for repetitively actuating said transmitter;

means for detecting radiation emanating in a borehole and providing third electrical signals representative of the detected radiation;

means for detecting couplings in a well casing and providing fourth electrical signals representative of the detection of such couplings; and means for sequentially processing said first, second, third and fourth signals for transmission during each time interval, including means for operating said selectively coupling means to couple one of said receiver means to said gain amplifying means during each time interval.

45. A logging tool for acoustically logging a cased borehole and including:

means for emitting and detecting acoustic energy in a borehole and for developing first and second electrical signals representative of the emission and detection of acoustic energy;

means for repetitively actuating said emitting means at preselected time intervals;

means for detecting radiation emanating in a borehole and providing third electrical signals representative of the detected radiation;

means for detecting couplings in a well casing and providing fourth electrical signals representative of the detection of such couplings;

calibrating means for providing calibration signals; and means for sequentially processing said first, second, third, fourth and calibrating signals during each time interval.

* * * * *